(12) United States Patent
Yang et al.

(10) Patent No.: US 7,539,303 B2
(45) Date of Patent: May 26, 2009

(54) KEYPAD ASSEMBLY

(75) Inventors: Qing Yang, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 518 days.

(21) Appl. No.: 11/391,875

(22) Filed: Mar. 28, 2006

(65) Prior Publication Data

US 2007/0036349 A1    Feb. 15, 2007

(30) Foreign Application Priority Data

May 28, 2005    (CN) .................. 2005 1 0034961

(51) Int. Cl.
*H04M 1/00*    (2006.01)
*H04M 9/00*    (2006.01)

(52) U.S. Cl. ................. 379/433.07; 379/433.01; 455/575.1

(58) Field of Classification Search ............ 379/428.01, 379/433.07, 437, 447, 451; 455/90.3, 575.1
See application file for complete search history.

(56) References Cited

U.S. PATENT DOCUMENTS

2003/0068035 A1*    4/2003    Pirila et al. ................. 379/447

FOREIGN PATENT DOCUMENTS

CN    99205034.0    7/2000

\* cited by examiner

*Primary Examiner*—Curtis Kuntz
*Assistant Examiner*—Tuan D Nguyen
(74) *Attorney, Agent, or Firm*—Steven M. Reiss

(57) ABSTRACT

A keypad assembly (20) is described that includes a housing (100) and a keypad (200) connecting with the housing. The housing has a keyhole area (144) formed thereon, and the housing has at least one keyhole (146) defined therein and a groove (148) is placed along a periphery of the keyhole area. The keypad has a key area (201) formed thereon, and the key area has at least one key (202) formed thereon and a projection (204) placed therearound to engage in the groove. A main advantage of the keypad assembly is that it can simplify the configuration of the seal while maintaining a good seal, and it also can reduce the production cost.

11 Claims, 6 Drawing Sheets

KEYPAD ASSEMBLY

FIELD OF THE INVENTION

The present invention relates to keypad assemblies and, particularly, to an environmentally sealed keypad assembly for use in electronic devices, such as mobile telephones, electronic notebooks, and so on.

DISCUSSION OF THE RELATED ART

With the development of wireless communication and information processing technologies, portable electronic devices, such as mobile telephones and personal digital assistants (PDAs), are now in widespread use. These electronic devices enable consumers to enjoy high technology services, anytime and anywhere. The keypad assembly as an input terminal has been an indispensable member of portable electronic devices.

Conventionally, a plurality of keys of a keypad assembly of a portable electronic device are typically inserted through a plurality of holes of a housing of the portable electronic device. A plurality of contacts, contacting with a circuit board for sensing input information, are disposed on the bottom of the keypad. When the portable electronic device becomes wet from exposure to a humid environment or rain, water or aqueous vapour may penetrate the portable electronic device via minor gaps between the keypad and the housing, and possibly cause damage or negatively influence the working of the portable electronic device. In addition, floating dust in the air may enter the portable electronic device, and affect capabilities of the portable electronic device.

Therefore, many manufacturers have designed keypad assemblies, which have a waterproof and dustproof structure, to solve such problems. Typically, a waterproof membrane is used to cover the surface of the keypad. Although suitable for the portable electronic devices, the manufacturing process is complicated and inconvenient to control. In addition, the waterproof membrane is easily destroyed. The process of sealing the keypad with glue is also used, but it may cause an increase in cost of manufacture, and exposure to inclement temperatures may affect the glue's performance and may eventually lead to malfunction or failure of the seal.

What is needed, therefore, is a keypad assembly which has a relatively simple and reliable configuration, which can be produced at a low cost, and which has a good waterproof and dustproof.

SUMMARY OF THE INVENTION

In one embodiment thereof, a keypad assembly is provided for inputting information into various kinds of electronic devices, such as mobile telephones. The keypad assembly includes a housing and a keypad connected to the housing. The housing has a keyhole area formed thereon, with at least one keyhole defined therein and a groove placed along a periphery of the keyhole area. The keypad has a key area formed thereon, with at least one key defined therein and a projection placed therearound to engage in the groove.

Other advantages and novel features will become more apparent from the following detailed description when taken in conjunction with the accompanying drawings, in which:

BRIEF DESCRIPTION OF THE DRAWINGS

Many aspects of the keypad assembly can be better understood with reference to the following drawings. Drawings are not necessarily drawn to scale, the emphasis instead being placed upon clearly illustrating the principles of the present keypad assembly. Moreover, in the drawings, like reference numerals designate corresponding parts throughout the several views.

DETAILED DESCRIPTION OF PERFERRED EMBODIMENTS

The present keypad assembly is suitable for portable electronic devices such as mobile phones, PDAs, and so on.

Figure 1:
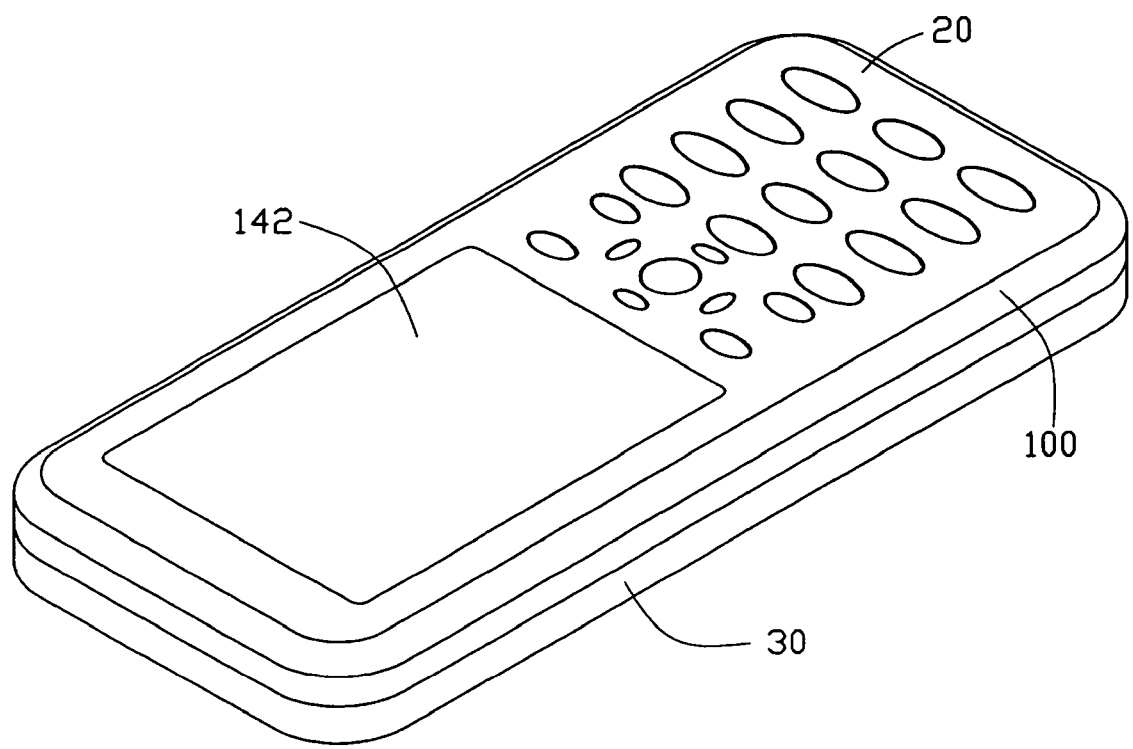
FIG. 1 is an isometric view of a portable electronic device including a keypad assembly in accordance with a preferred embodiment of the present invention.

Referring now to the drawings in detail, FIG. 1 shows a portable electronic device 10 (e.g., a mobile phone) employing a keypad assembly 20. The mobile phone 10 is taken here as an exemplary application, for the purposes of describing details of a keypad assembly of an embodiment.

Figure 2:
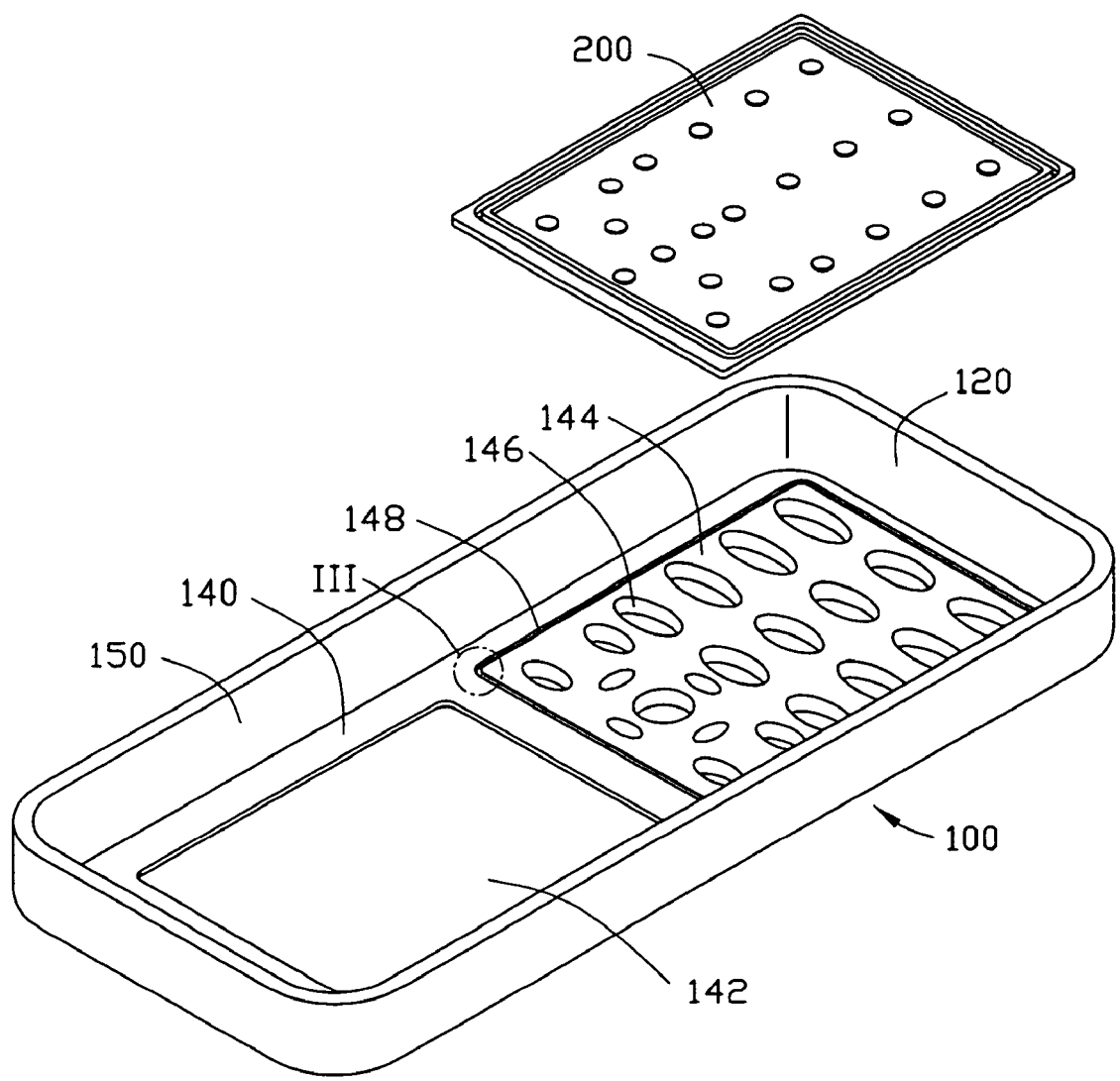
FIG. 2 is an exploded inverted isometric view of the keypad assembly shown in FIG. 1.
Figure 3:
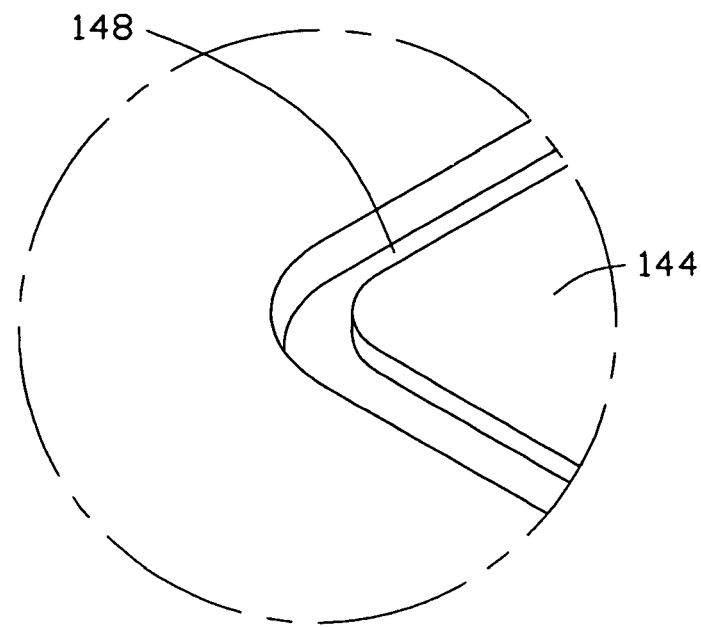
FIG. 3 is an enlarged isometric view of a portion III of the keypad assembly shown with dashed lines in FIG. 2.

FIG. 2 shows various parts of the keypad assembly 20. The keypad assembly 20 is used to input information into various kinds of electronic devices, such as a mobile phone 10. The mobile phone 10 includes a keypad assembly 20 and a main body 30. The keypad assembly 20 includes a housing 100 and a keypad 200. The housing 100 is configured to shield the keypad 200 and connects with the main body 30.

The housing 100 includes a peripheral wall 120 and a lower wall 140. The peripheral wall 120 and the lower wall 140 cooperatively define a receiving cavity 150 therebetween for receiving the keypad 200. The lower wall 140 has a display area 142 formed thereon, and it also has a keyhole area 144 formed thereon, adjacent to the display area 142. The keyhole area 144 defines a plurality of keyholes 146 and has a groove 148 defined along a periphery of the keyhole area 144. The groove 148 is of rectangular shape.

Figure 4:
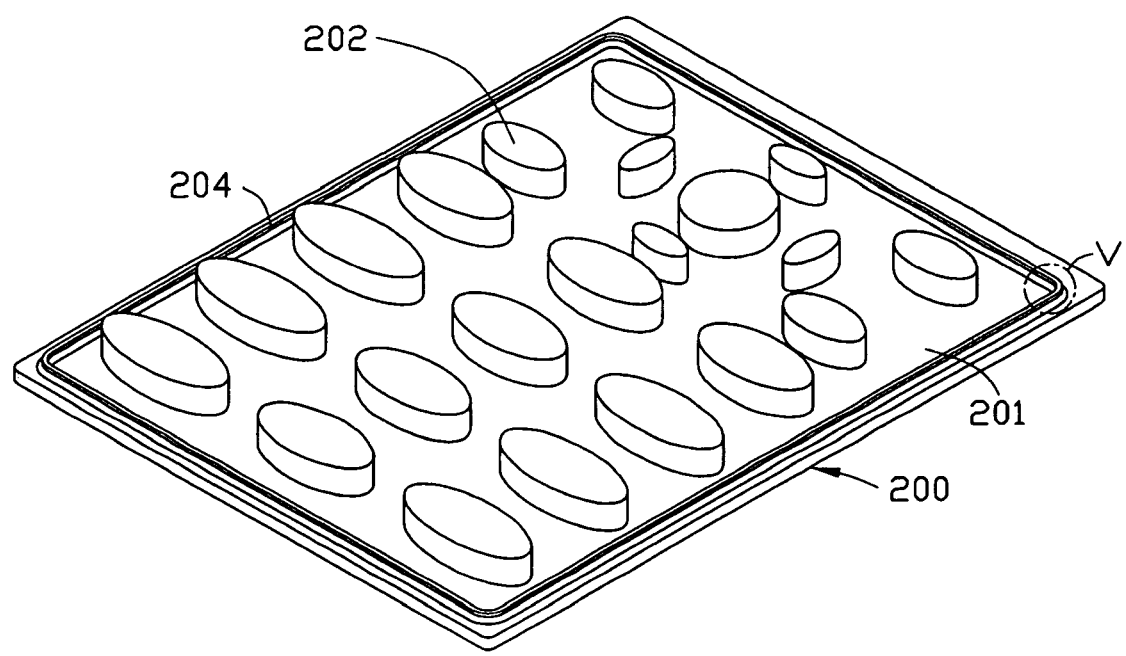
FIG. 4 is an enlarged isometric view of the keypad shown in FIG. 2.
Figure 5:
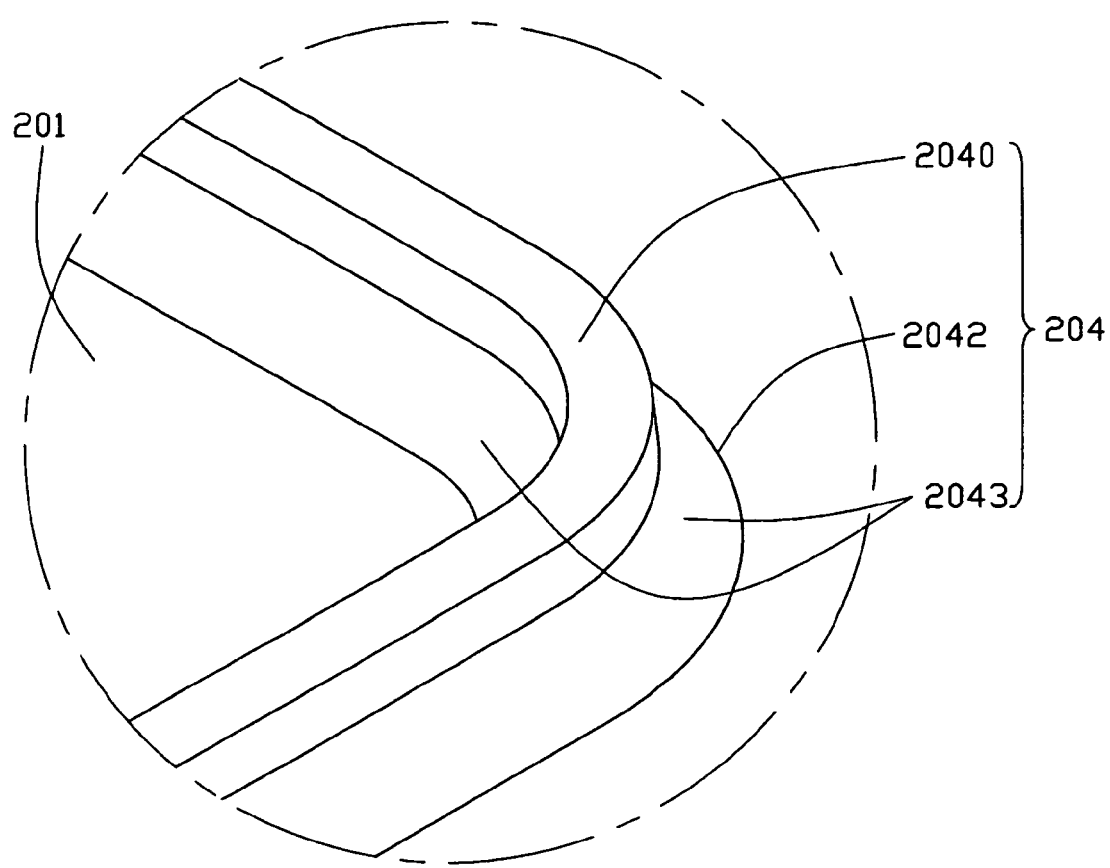
FIG. 5 is an enlarged isometric view of a portion V of the keypad shown with dashed lines in FIG. 4.

Referring also to FIG. 4, the keypad 200 is made of elastomeric rubber, which flexibly conforms to curved and irregular surfaces of the housing 100 and underlying structural elements. The keypad 200 has a key area 201 formed at one side. A plurality of keys 202 is formed protruding from the key area 201. Each key 202 corresponds to a keyhole 146. A generally rectangular-shaped projection 204 is provided around the key area 201, and interferingly engages in the groove 148 to enable a seal between the keypad 200 and the housing 100. Referring to FIG. 5, the projection 204 includes a rectangular head portion 2040 and a connecting portion 2042. The connecting portion 2042 has two slanted side arms 2043, respectively connecting the head portion 2040 from opposite sides to the key area 201.

Figure 6:
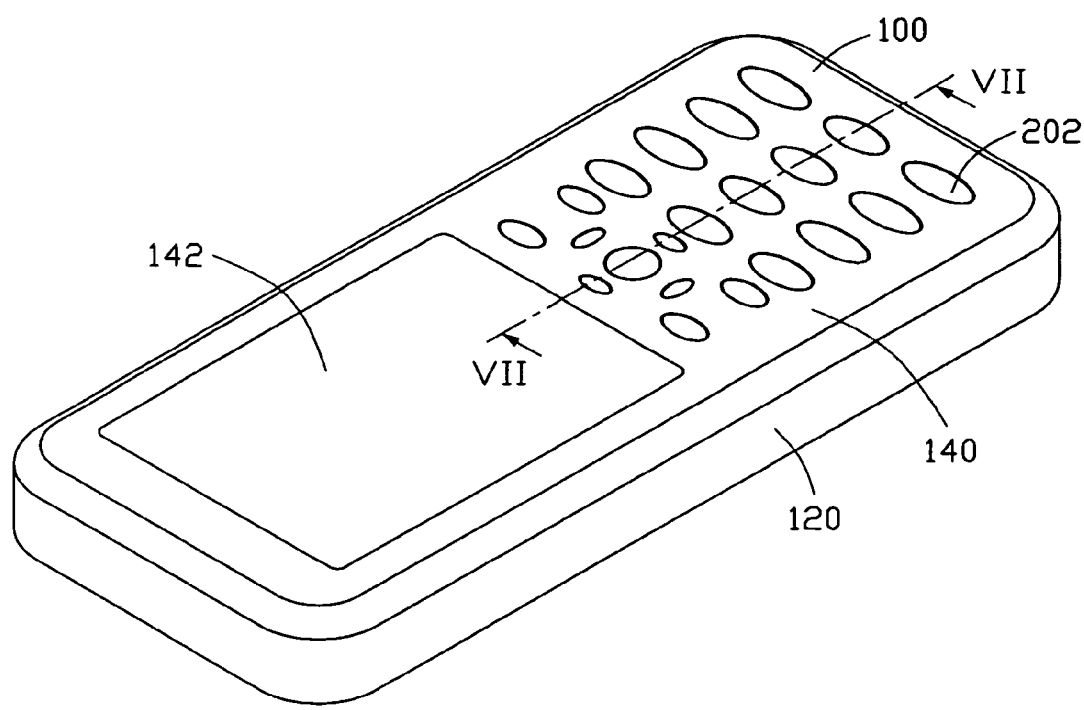
FIG. 6 is a preassembled view of the keypad assembly of FIG. 1.
Figure 7:
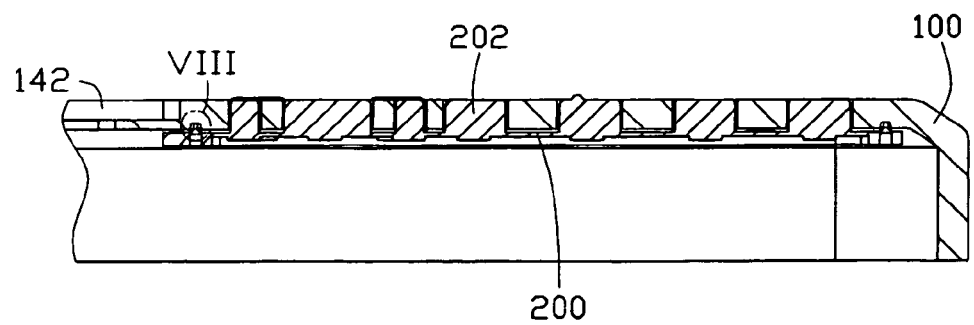
FIG. 7 is a cut-away view of the preassembled keypad assembly shown in FIG. 6 taken along lines VII-VII.
Figure 8:
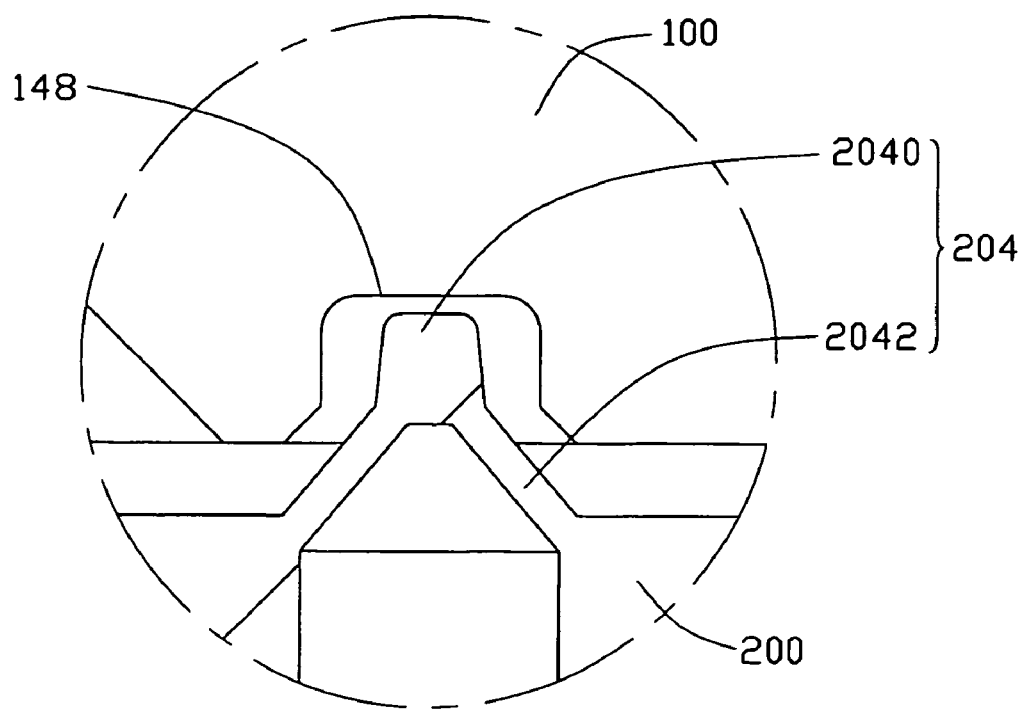
FIG. 8 is an enlarged view of a portion VIII of the preassembled keypad assembly shown with dashed lines in FIG. 7.
Figure 9:
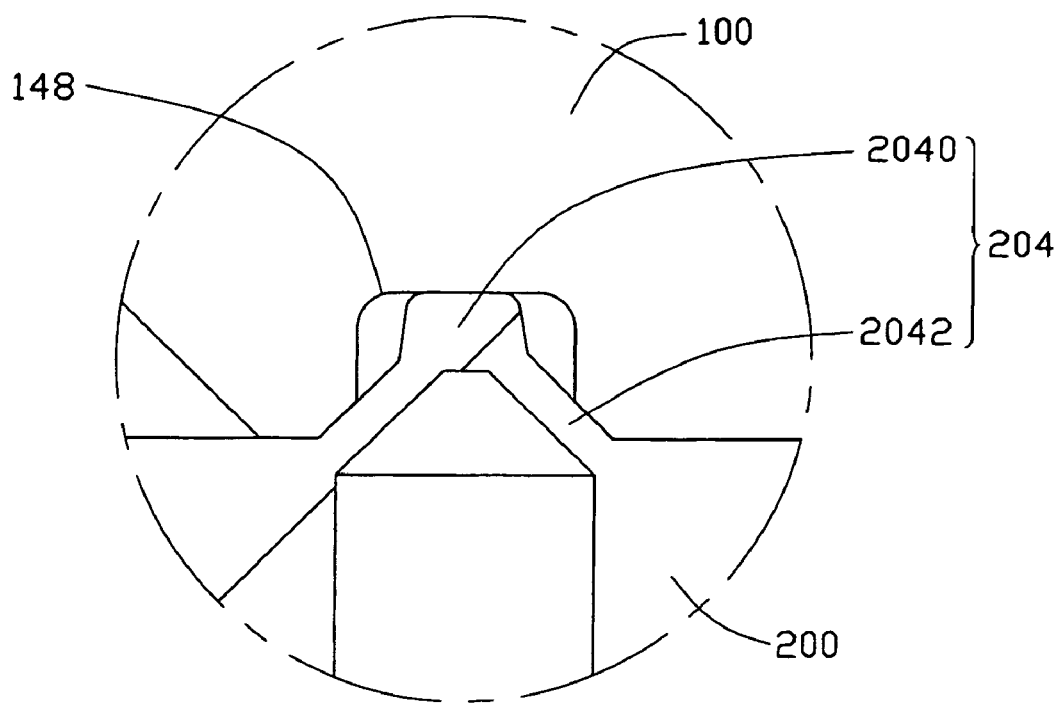
FIG. 9 is an assembled view of the keypad assembly shown in FIG. 8.

In assembly of the keypad assembly 20, firstly, referring to FIG. 6 through 8, each key 202 of the keypad 200 is aligned with a respective keyhole 146 of the housing 100. Secondly, referring to FIG. 9, projection 204 of the keypad 200 is pressed into the groove 148 of the housing 100. The projection 204 engages interferingly in the groove 148 by pressing the head portion 2040 and the connecting portion 2042 to produce elastic deformation thereof, thereby sealing the groove 148 to integrate the keypad 200 with the housing 100.

A main advantage of the keypad assembly 20 is that it can simplify the configuration of the seal while maintaining a good seal, and it also can reduce the production cost.

In further alternative embodiments, a plurality of projections 204 of the keypad 200 can instead be disposed respectively around each key 202 of the keypad 200, accordingly, a plurality of grooves 148 would be consecutively defined around each corresponding keyhole 146. The projections 204 can be frames in a shape of a closed-curve; accordingly, the grooves 148 would have the same shape as the projections 204. The cross-section of the projections 204 can instead be rectangular-shaped. The keypad can be made of another kind of elastic material, such as elastomeric membrane.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A keypad assembly for a portable communication device, comprising: a housing having a keyhole area formed thereon, the keyhole area having at least one keyhole defined therein, the housing having a groove defined along a periphery of the keyhole area; a keypad connecting with the housing and having a key area formed thereon, the key area having at least one key formed thereon, the keypad having a projection formed thereon and placed around the key area, the projection and the at least one key located on a same side of the keypad, the projection configured to interferingly engage the groove of the housing to seal the groove; wherein the keypad is made of elastic material; wherein the projection is a closed-curve shaped continuous frame, the groove of the housing having a shape corresponding to that of the projection and wherein the projection is configured to be pressed to be elastically deformed to interferingly engage and seal the groove.

2. The keypad assembly as claimed in claim 1, wherein the projection comprises a head portion and a connecting portion, the connecting portion connecting the head portion with the housing.

3. The keypad assembly as claimed in claim 2, wherein the head portion has a generally rectangular shape in cross section.

4. The keypad assembly as claimed in claim 2, wherein the connecting portion comprises two slanted side arms, respectively connecting the head portion form opposite sides to the key area.

5. The keypad assembly as claimed in claim 1, wherein the projection is a generally rectangular-shaped continuous frame, the groove of the housing having a shape corresponding to that of the projection.

6. A keypad assembly for a portable communication device, comprising: a housing having a keyhole area, the keyhole area having at least one keyholes defined therein, the housing having a plurality of grooves, each groove surrounding at least one keyhole; a keypad having a key area, the key area having a plurality of keys formed thereon, the keys being respectively received in the keyholes, the keypad including a corresponding number of projections formed thereon, the projections and the keys located on a same side of the keypad, wherein each groove aligns with each corresponding projection, the projections are configured to interferingly engage and seal the groove, respectively; wherein the projections are closed-curve shaped continuous frames, the grooves of the housing having a shape corresponding to that of the projections and wherein the projections are configured to be elastically deformed to interferingly engage and seal the grooves.

7. The keypad assembly as claimed in claim 6, wherein the keypad is made of elastic material.

8. A keypad assembly for a portable communication device comprising: a housing having a keyhole area, the keyhole area having a plurality of keyholes defined therein, the housing having a groove defined therein, the groove surrounding at least one keyhole; a keypad having a key area, the key area having a plurality of keys formed thereon, the keys being respectively received in the keyholes, the keypad including a projection formed thereon, the projection surrounding at least one key, the projection and the at least one key located on a same side of the keypad, the projection being made of elastic material and elastically deformed when hermetically engaging in the groove; wherein the projection surrounds all of the keys; wherein the projection comprises a head portion and a connecting portion, the connecting portion connecting the head portion with the housing and wherein the projection is closed-curve shaped continuous frame, the groove of the housing having a shape corresponding to that of the projection.

9. The keypad assembly as claimed in claim 8, wherein the head portion has a generally rectangular shape in cross section.

10. The keypad assembly as claimed in claim 9, wherein the connecting portion comprises two slanted side arms, respectively connecting the head portion form opposite sides to the key area.

11. The keypad assembly as claimed in claim 8, wherein the projection is a generally rectangular-shaped continuous frame, the groove of the housing having a shape corresponding to that of the projection.

* * * * *